United States Patent [19]
Callahan

[11] Patent Number: 5,119,457
[45] Date of Patent: Jun. 2, 1992

[54] HIGH-PERFORMANCE ELECTRIC POWER CABLE AND CONNECTOR SYSTEM

[75] Inventor: Thomas F. Callahan, Maynard, Mass.

[73] Assignee: University Research Engineers & Associates, Inc., Maynard, Mass.

[21] Appl. No.: 567,796

[22] Filed: Aug. 15, 1990

[51] Int. Cl.[5] ............................................. G02B 6/44
[52] U.S. Cl. ................................... 385/107; 385/100; 385/102; 174/79
[58] Field of Search ............... 350/96.20, 96.21, 96.22, 350/96.23; 385/107, 100, 102; 174/79

[56] References Cited

U.S. PATENT DOCUMENTS

| | | |
|---|---|---|
| 3,676,576 | 7/1972 | Dubernet et al. |
| 4,084,065 | 4/1978 | Swenson ............................ 174/70 R |
| 4,156,104 | 5/1979 | Mondello .......................... 174/70 R |
| 4,312,260 | 1/1982 | Morieras ................................. 87/1 |
| 4,399,322 | 8/1983 | Hafner, Jr. .......................... 174/101 |
| 4,443,658 | 4/1984 | Seguin ............................... 174/113 C |
| 4,609,416 | 9/1986 | Himmelberger et al. ........... 174/103 |
| 4,640,179 | 2/1987 | Cameron ................................. 87/6 |
| 4,690,498 | 9/1987 | Priaroggia ........................ 350/96.23 |
| 4,720,164 | 1/1988 | Oestreich ......................... 350/96.23 |
| 4,725,123 | 2/1988 | Anelli et al. ..................... 350/96.23 |
| 4,743,085 | 5/1988 | Jenkins et al. ................... 350/96.23 |
| 4,743,711 | 5/1988 | Hoffman ............................ 174/109 |
| 4,816,620 | 3/1989 | Beach ................................. 174/115 |
| 4,861,947 | 8/1989 | Altermatt et al. ............... 174/113 C |
| 4,881,794 | 11/1989 | Bartoszek ........................ 350/96.23 |

OTHER PUBLICATIONS

Phase I Final Report-Title: "A Novel Concept for the Rapid Deployment of Electric Power Cables", Apr. 1987.

Primary Examiner—Akm E. Ullah
Assistant Examiner—Phan T. Heartney
Attorney, Agent, or Firm—Venable, Baetjer and Howard

[57] ABSTRACT

A cable and connector system comprises a cable having a plurality of conductors for carrying electric current. The conductors are surrounded by a plurality of aramid fiber tension members that carry tensile loads that are applied to the cable. The conductors and tension members are wrapped with an aramid fiber armor tape. The armor tape protects the bundle from crushing loads and penetration by sharp objects. A connector is provided at each end of the cable whereby the tension members of the cable may be fixedly attached to the connector such that the tensile loads carried by the tension members are directly transmitted to the connector and are not transmitted to the conductors.

44 Claims, 5 Drawing Sheets

HIGH-PERFORMANCE ELECTRIC POWER CABLE AND CONNECTOR SYSTEM

The present invention was made with Government support, and the Government has certain rights in the invention.

BACKGROUND OF THE INVENTION

The present invention relates to high performance electric power cables and connectors and, in particular, to an improved cable and connector system that can endure rigorous tension and compression forces and which is easily and safely transportable.

The military, as well as commercial industries such as the mining industry, have a need for reliable, portable cable and connector systems for carrying electric power to remote locations. It is necessary that these cable systems be easily manipulable and safely transportable. Accordingly, the cables used in such systems should be relatively flexible and be capable of withstanding the harsh environmental conditions and severe abusive treatment which is characteristic of operations in mining or in the military.

For instance, power cables in the field may be exposed to extreme crushing and torsional loads created by heavy vehicles traveling across the cables. The cables may also be exposed to other compressive forces such as those created upon impact by sharp objects propelled at high velocities. In addition to these compressive forces, the cables must also be capable of sustaining high tensile forces that are typically created when the cables are deployed for use. Sometimes it is necessary to suspend a cable across a long span, for example, across a ravine or river, in order to provide power for use on the opposite side. Typically, even the weight of the cable alone may be sufficient to produce tensile loads which are beyond the tensile limit of the cable. Therefore, it is often necessary to provide support for the cable for even a short span.

Conventional portable power cable systems often fail under the harsh conditions described above. Typically, the cable systems use twisted strands of copper wire for both conducting electricity and for carrying tensile loads that are applied to the cable. While copper can be a good conductor of electricity, it is not a relatively strong structural material and is thus unable to withstand significant tensile loads. Accordingly, the copper wires of conventional cables tend to break under severe compression and tension forces, thereby rendering the cables unfit for transmitting electricity.

The normal cable system includes connectors for interfacing the cables with either a power supply, a device to be powered or another cable. The type of connector used with the cable can have a substantial effect on the survivability and effectiveness of the cable. A common failure with conventional cable systems is the separation of the connector from the cable in the presence of large tensile loads. Typically, the conventional cables are designed such that the internal conductors support the principal tensile loads. The conductors continue to support a substantial portion of the tensile loads even when the cable is attached to the connector. There is no effective transmission of tensile loads to and from the conductors and the connector. As a result, the conductors often eventually fail under the tensile loads, thereby causing the entire cable to separate from the connector.

SUMMARY OF THE INVENTION

In accordance with the present invention, the foregoing limitations and disadvantages of the prior art are substantially avoided by providing a cable and connector system that effectively prevents tensile loads and compressive loads from being transmitted to the conductors. Accordingly, the cable of the present invention has a high-strength tension cord which carries the Principal tensile forces applied to the cable. Preferably, the tension cord is centrally located. However, this central location is not essential for the cable to function properly, and, therefore, other radial positions for the cord are feasible. A plurality of conductors are positioned near the principal tension cord such that they do not carry substantial tensile loads. In order to protect the conductors from compressive and puncture forces applied to the cable, high-strength tape is wound around the conductors and the tension cord. In a Preferred embodiment, two layers of tape are wrapped around the conductors in a counterwound manner. Secondary high-tensile strength cords may be positioned within voids or interstices that may be Present between the adjacent conductors and the high-strength tape in order to provide additional tensile support for the cable. An outer neoprene jacket further surrounds the high-strength tape to provide additional puncture, abrasion and moisture protection for the conductors.

In a preferred embodiment of the invention, tape made of a nonstick fluorinated polymer such as polytetrafluoro ethylene (PTFE), known by the trademark TEFLON, is sandwiched between the the high-strength tape and the outer neoprene jacket, and between the high-strength tape and the conductors. The TEFLON layers of tape allow the high-strength tape to shift slightly within the cable during bending, thereby preventing the occurrence of binding of the high-strength tape and the conductors encased therein.

The connector of the present cable and connector system is attached to a distal end of the cable. The cable is fixed to the connector by securing the principal and secondary tension cords to a collet member and binder sleeve assembly and subsequently fastening the assembly to an interior flange of the connector. With this arrangement, the tensile loads carried by the tension cords are directly transmitted to the connector such that the conductors of the cable do not support tensile loads.

BRIEF DESCRIPTION OF THE DRAWINGS

The invention will now described fully with reference to the drawings, in which.

DETAILED DESCRIPTION OF THE PREFERRED EMBODIMENTS

Figure 1:
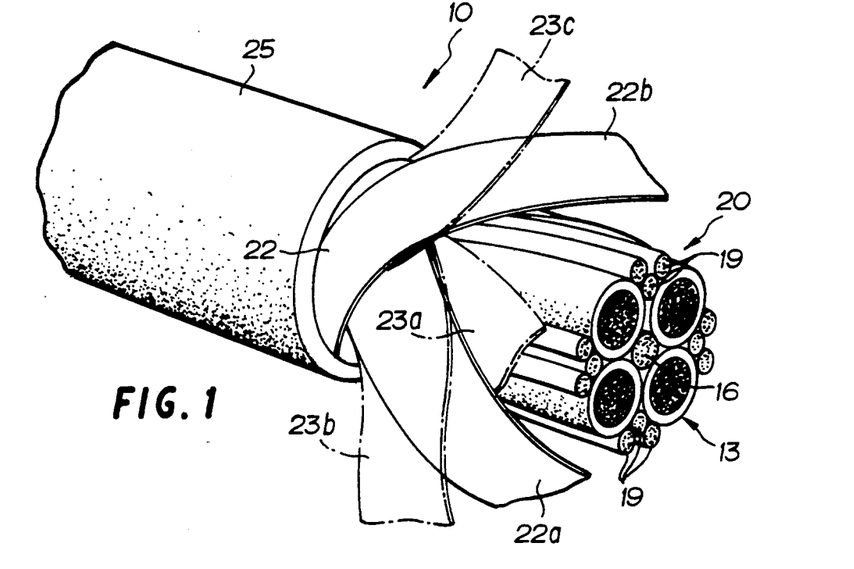
FIG. 1 is a perspective view of a high-performance electric power cable according to the present invention.
Figure 2:
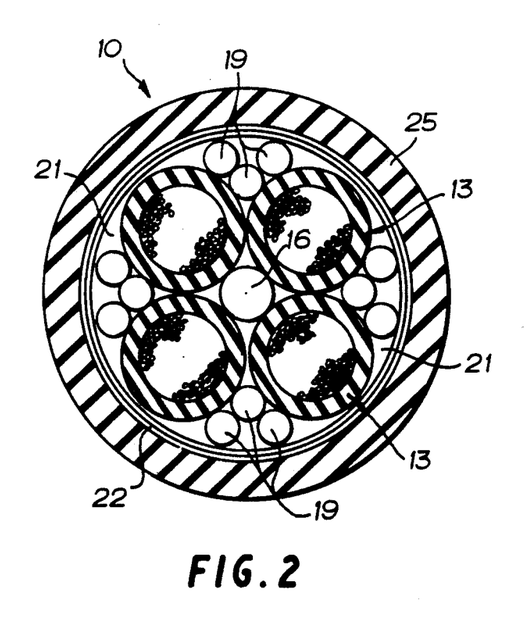
FIG. 2 is a cross-sectional view of the high-performance electric power cable of FIG. 1.

The invention will be initially described in general terms with reference to FIG. 1. FIG. 1 illustrates a first embodiment of a section of a high-performance electrical power cable 10 according to the present invention. Within the cable 10 are a Plurality of conductors 13 for carrying electrical energy, light energy or a combination thereof. The conductors 13 are surrounded by a plurality of tension cords 16 and 19 which carry tensile loads that are applied to the cable 10 during use. The conductors 13 and tension members 16 and 19 are twisted or otherwise gathered together to form a bundle 20 which is wrapped with two layers of armor tape 22. The bundle 20 may alternatively be wrapped with only a single layer or with more than two layers of armor tape. The armor tape 22 protects the bundle 20 from crushing loads and resists penetration by sharp objects. An outer neoprene jacket 25 is provided to protect the cable 10 from abrasions, tears, or ingress of water or chemicals, as well as to retain the interior elements together.

The cable 10 will now be more specifically described in reference to FIGS. 1-5. The tension members or cords 16 and 19 are designed to carry cable tensile loads that in conventional cables are ordinarily transmitted to the conductors 13. Preferably, the cords 16 and 19 are formed from high-strength, dielectric aramid fibers such as those sold under the trademark KEVLAR and differ from one another in accordance with their size and/or position within the cable. The KEVLAR fiber cords exhibit desirable high-tensile strength characteristics, yet are relatively light-weight and flexible. Therefore, the KEVLAR does not substantially add to the weight of the cable nor impede the handling of the cable.

The principal tensile loads applied to the cable 10 are supported by the KEVLAR cord 16. Preferably, the cord 16 is centrally located; however, other radial positions are feasible. Disposed in the interstices 21 (FIG. 2) present between adjacent conductors 13 and armor tape 22 are secondary KEVLAR cords 19 that provide supplementary tensile support. The secondary KEVLAR cords 19 also act as a filler material so that the cable 10 has a more cylindrical configuration. Conventional cables ordinarily use low-cost fillers such as hemp to fill the interstices and Provide the desired bulk. These low cost fillers, however, do not carry tensile loads and do not contribute to the overall performance of the cable as do the secondary tension members 19.

The armor tape 22, like the tension members 16 and 19, is constructed of aramid fibers such as KEVLAR that are woven together to form fabric tape. In a preferred embodiment, two counterwound, inner and outer layers of KEVLAR tape, designated respectively by reference characters 22a and 22b (FIG. 1), are wrapped around the bundle 20 to form a double layer of Protection. In addition to protecting the bundle 20 from crushing loads and from penetration by sharp objects, the tape 22 also restrains radial movement of the bundle 20 while under compressive loads. This restraint of movement reduces the amount of stretching of the bundle 20 that ordinarily occurs when it is subjected to compressive loads and, therefore, Prevents possible rupture of the conductors 13.

As shown in FIG. 1 in phantom, a nonstick tape 23a, 23b, and 23c may be placed on either side and in between the KEVLAR layers 22a and 22b in order to allow the KEVLAR layers, jacket 25 and bundle 20 to more freely slide with respect to each other as the cable 10 flexes and bends. Preferably, the tape 23a, 22b, and 23c is made from TEFLON. In the absence of the TEFLON tape 23a, 23b, and 23c, the following occurrences may take place: the KEVLAR layers of tape may mechanically bind together, the outer KEVLAR layer 22b may mechanically bind to the jacket 25, and the inner KEVLAR layer 22b may mechanically bind to the bundle 20. This binding of the KEVLAR tape may repress the bending of the cable 10 and at a minimum create frictional heating within the cable which can adversely effect cable longevity and performance.

For the cable 10 to bend substantially and relatively easily, the KEVLAR tape layers 22a and 22b should be able to either stretch or shift and slide slightly within the cable in response to the tensile forces created by the bending. However, the high-tensile strength of the KEVLAR prevents the tape layers 22a and 22b from stretching. The presence of the TEFLON tape 23a, 23b, and 23c, on the other hand, allows the two layers of KEVLAR tape 22a and 22b to shift relative to one another and to the outer jacket 25 and bundle 20 during bending of the cable 10. The TEFLON material is preferable because it allows the KEVLAR tape 22 to move without substantial frictional heating. As an alternative to having a sandwich structure of TEFLON tape and KEVLAR tape, the KEVLAR tape 22 can be directly coated with TEFLON material. This may be accomplished by known dispersion coating methods. The coating, like the separate layers of TEFLON tape, allows the KEVLAR tape to shift smoothly during bending.

Figure 3:
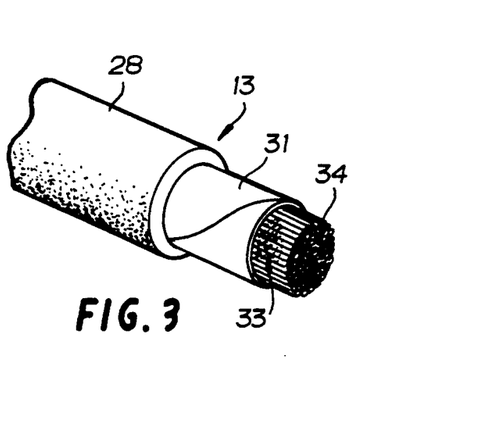
FIG. 3 is a perspective view of a conductor of the high-performance cable according to the present invention.

Referring to FIG. 3, the individual conductors 13 are preferably formed from a plurality of tightly twisted copper wire strands 34. Other conducting material, however, such as aluminum or intercalated graphite compounds, may be used in place of the copper A jacket 28 of ethylene-propylene-rubber (EPR) material surrounds the copper strands 34 to electrically and physically insulate the copper strands. Unlike in conventional conductors, a layer of semi-stiff, non-metallic tape 31 is positioned between the copper strands 34 and EPR jacket 28. Suitable semi-stiff, non-metallic material includes TEFLON and the material known by the trademark MYLAR. Preferably, the tape 31 is made from TEFLON, as this material has an additional dimension of lubricity. The lubricity of the TEFLON tape 31 helps to reduce the amount of friction created during bending.

Figure 4A:
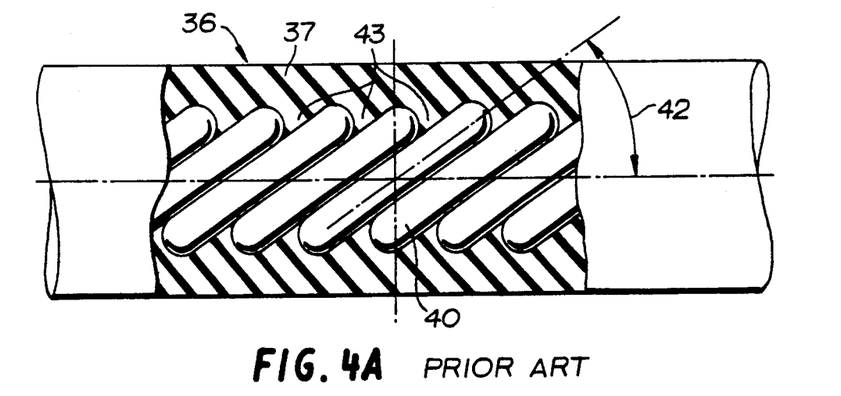
FIG. 4a is a partially cut-away elevational view of a section of a prior art conductor.

As illustrated in FIG. 4a, with conventional electric power conductors 36, EPR insulation 37 is normally applied directly to the twisted copper strands 40. Typically, therefore, there is a mechanical bonding of the EPR material 37 to the copper strands 40 at interstices 43 present between outer, adjacent strands 40. The EPR and conductors are mechanically interlocked. Accordingly, when the conductor 36 is bent, the EPR material 37 in the interstices 43 tends to "brake" the movement or bending of the stands 40, thus reducing the overall flexibility of the conductor 36. When several of the conductors 36 are placed in a single cable, this diminution in flexibility may have a substantial affect on the overall flexibility of the cable.

Figure 4B:
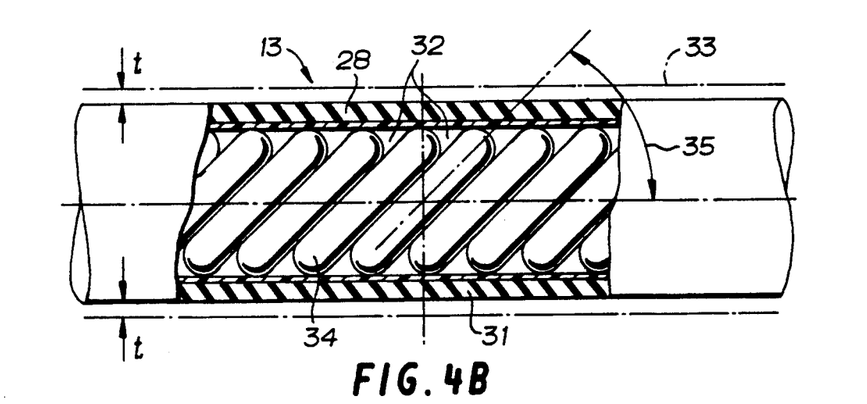
FIG. 4b is a partially cut-away elevational view of a section of the conductor according to the present invention.

As illustrated in FIG. 4b, by providing the conductor 13 with a layer of TEFLON (or other semi-stiff, non-metallic material such as MYLAR) tape 31, there is no bonding of the EPR material 28 to the copper strands 34 at the interstices 32 formed between outer, adjacent strands 34. Accordingly, the "brake", that normally occurs if EPR material is present in the interstices 32, is eliminated and the conductor 13 exhibits improved flexibility.

The present invention conductor 13 also has several other features that improve its overall flexibility. The protection provided by the tension members 16 and 19 and armor tape 22 eliminates a need for additional safety precautions that are typically applied to conventional conductors used in hostile environments and which generally tend to inhibit the flexibility of those conductors.

For example, according to the Insulated Cable Engineers Association (ICEA), conventional conductors 36 (FIG. 4a) that are expected to be exposed to hostile environments should be provided with 33 thicker insulation 37 than is provided on conductors subjected to normal use. This extra thickness, while Providing added protection to the copper strands 40, also decreases the overall flexibility of the conductor 36.

However, the protection provided by the armor tape 22 of the present invention eliminates a need for the extra thickness of EPR insulation recommended by the ICEA. Accordingly, the present invention conductor 13 can have a decreased thickness of the insulation 28 as compared to that of conventional conductor 36. This difference in thickness is illustrated in FIG. 4b by thickness t. Thickness t represents the difference in thickness of EPR insulation between the conventional conductor (as represented in phantom 33) and the present invention conductor 13.

Another feature of the conductor 13 that enhances its overall flexibility is that the lay-of-twist of the copper strands 34 can be shorter than that of conventional conductors 36. The flexibility of a conductor is directly related to the lay-of-twist or Pitch of the individual strands of the conductor. For example, the well-known "SLINKY" (Trademark) toy has a very short lay-of-twist and is, therefore, very flexible; however, it is also easily crushed. Ordinarily, the longer the lay-of-twist of the conductor, the more resistant it is to crushing and the less flexible it becomes.

Because the armor tape 22 substantially shields the conductors 13 from crushing loads, the copper strands 34 can have a shorter lay-of-twist than conventional conductors 36. This difference in the lay-of-twist is illustrated by the different pitch angles, which are represented in FIGS. 4a and 4b by reference numbers 35 and 42, for the present invention copper strands 34 and the conventional strands 43, respectively. The larger the pitch angle, the shorter the lay-of-twist and, consequently, the more flexible the conductor. As illustrated, the pitch angle 35 of the conductor 13 is comparatively larger than the pitch angle 42 of the conventional conductor 36, thereby providing the conductor 13 with a greater degree of flexibility than the conventional conductor 36.

The shorter lay-of-twist can also improve the longevity of the conductors 13. Typically, high-performance power cables are repeatedly subjected to bending, stretching, and twisting during use, storage, and transportation. This handling of the cables may eventually cause metal fatigue to the internal copper strands, resulting in strand failures. A shorter lay-of-twist, however, reduces the tension forces applied to the copper strands during bending and, consequently, delays eventual failure-producing metal fatigue.

Also incident to bending and twisting of the cable is relative motion and friction between the individual strands of copper, which results in a heating of the strands at a localized, microscopic level. An occurrence associated with the frictional heating is autofrettage, a microscopic welding of surface particles, which produces rough surfaces and stress concentrations. To mitigate the autofrettage, the copper strands 34 can be provided with a dry lubricant 33 of a type that is composed of conductive carbon. The lubrication reduces friction between the strands 34. Preferably, a thermo setting polymer, filled with a fine graphite powder, is applied to the bare copper wire 34 and heat cured to create a protective, conductive, dry lubricant.

Figure 5:
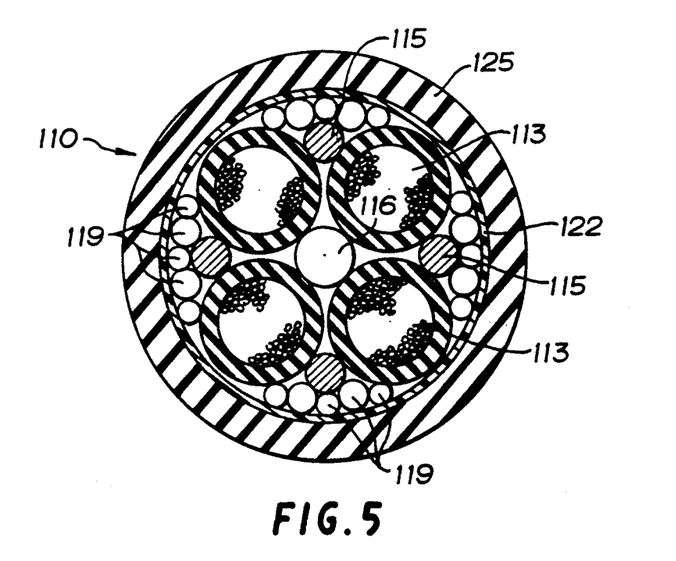
FIG. 5 is a cross-sectional view of a second embodiment of the high-performance electric power cable according to the Present invention.

With reference to FIG. 5, a second embodiment of the Present invention is illustrated. Cable 110 is basically similar to cable 10. It has a plurality of conductors 113, a central, principal tension cord 116, secondary tension members 119, and a double layer of armor tape 122. The cable 110, however, is also provided with ground wires 115 and has a KEVLAR braid reinforced neoprene jacket 125. The jacket 125 provides superior abrasion resistance and additional armor protection from sharp objects which could otherwise penetrate and cut through to the conductors 113 and ground wires 115.

Figure 6:
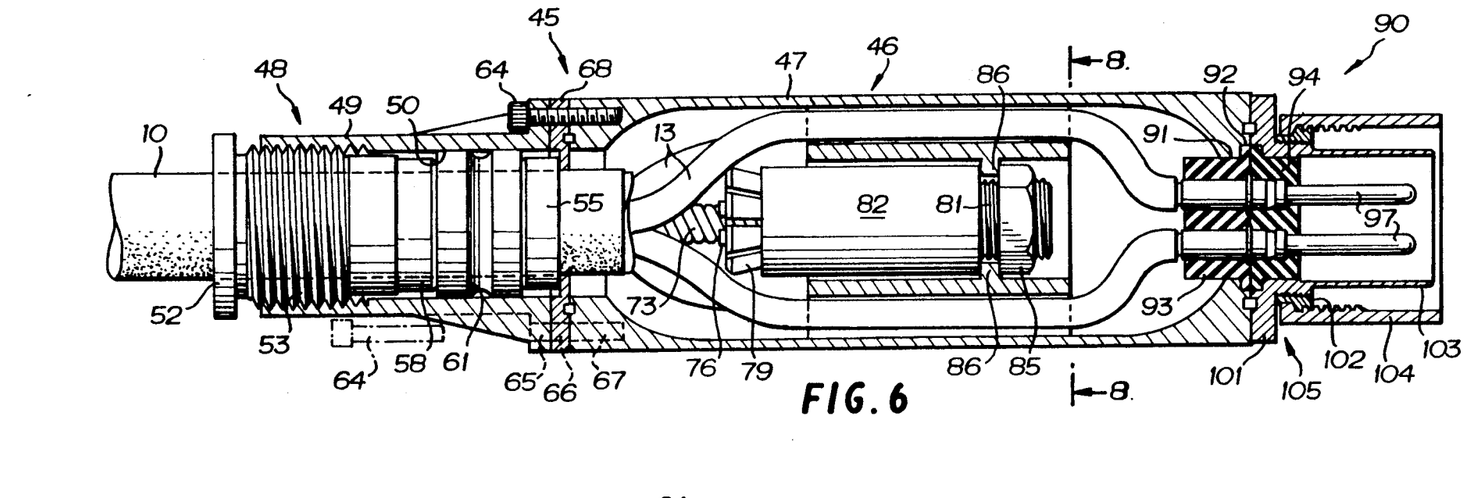
FIG. 6 is a cross-sectional elevational view of a connector according to the present invention.

FIG. 6 illustrates a connector 45 which can be used to interface either of the high-performance power cables 10 and 110 with other devices such as a power source, another power cable, or equipment to be provided with electricity. The connector 45 is designed to effectively transmit the tensile loads, which are applied to the cable 10 and carried by the tension members 16 and 19, directly to or from the connector 45, thereby preventing tensile loads from being transmitted to the conductors 13. To this end, the connector 45 provides a reliable means for fixedly securing the tension members 16 and 19 directly to the connector 45.

The connector 45 has two main parts, a connector assembly 46 and a moisture sealing gland assembly 48. In a preferred embodiment, the connector assembly 46 provides a means for coupling the conductors 13 to a suitable known socket or pin contact assembly. The contact assembly may, accordingly, be Plugged into a complementary device (not shown). In FIG. 6, the conductors 13 are shown coupled to a standard contact assembly 90. The contact assembly includes a pin insert 93 comprising pin contacts 97 and electric insulated spacers 92 and 94. The spacer 92 is seated in an opening 91 of the connector assembly 46. A shell and nut assembly, designated generally by reference numeral 105, aids in coupling the pin insert 93 to another device. The shell and nut assembly 105 includes a connector body adapter flange 101 that is mounted to the connector housing 47. Integral with the adapter flange 101 is an inner shell 103. An outer shell 104 surrounds the inner shell 103 and is held in place by a threaded retainer nut 102. Gland assembly 48 is provided at an end of the connector assembly 46 opposite that of the contact assembly 90, to both prevent entry of damaging moisture and other corrosive material into the connector and to transmit to the gland housing 49 a portion of the tensile loads that are applied to the cable.

Figure 7:
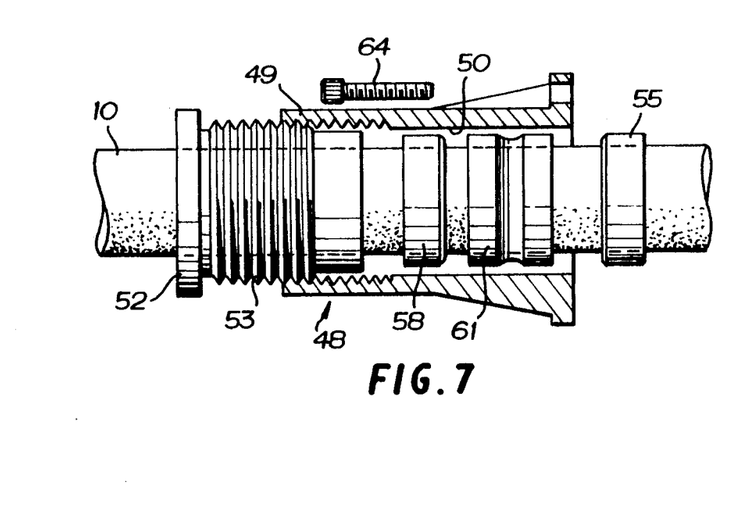
FIG. 7 is a slightly exploded view of a prior art gland assembly.

The elements of the gland assembly 48 are more clearly shown in FIG. 7, which illustrates a slightly exploded view of the assembly 48 from that depicted in FIG. 6. In fitting the assembly 48 to the cable 10, initially, a gland ring compression nut 52 is circumferentially positioned around a distal end of the cable 10, and a gland housing 49 is brought into engagement with the first several threads 53 of the compression nut 52. An elastomer, moisture sealing gland 61 and accompanying inner and outer compression rings 55 and 58 are packed between the housing 49 and cable 10, and the gland housing 49 may be secured to the connector assembly 46. A gland support and spacer ring 68 provides an interface between the gland housing 49 and the connector housing 47. In order to hold the housings 47 and 49 and the ring 68 together, socket head machine screws 64 are inserted through the bores 65, 66, and 67 of the gland housing 49, gland support ring and spacer ring 68, and connector housing 47, respectively. Alternatively, the screws 64 may be replaced with threaded tie rods (not shown) that are inserted into bores (not shown) that extend the entire length of the connector housing 47 from bore 67 to and into adapter flange 101. The threaded tie rod, therefore, serves the dual purpose of securing the gland assembly 48 to the connector housing 47 and helping to secure the adapter flange 101 to the connector housing 47.

Once the gland housing 49 is secured to the connector 46, the gland 61 is compressed by turning the compression nut 52 such that substantially all of the threads 53 of the compression nut 52 engage the gland housing 49. The compressed gland 61 thereby presses against the interior walls 50 of the gland housing 49 and squeezingly engages the outer jacket 25 of the cable 10. The compressed gland 61 effectively forms a seal to keep moisture away from the interior of the connector assembly 46. Furthermore, as the gland 61 squeezes the cable 10, it transmits a portion of cable tensile forces to the gland housing 49. However, because of the nature of elastomer material, the gland 61 is subject to failure. Therefore, the gland 61 is not a relatively reliable means for relieving the cable 10, and the interior conductors 13, from tensile loads.

The tensile loads of the present invention cable 10, however, are principally carried by the tension members 16 and 19. Therefore, a primary objective of the connector assembly 46, besides Providing a means for coupling the conductors 13 to the contact assembly 90, is to effectively and reliably transmit the tensile loads carried by the tension members 16 and 19 directly to and from the connector housing 47.

The connector assembly 46 is mounted to the cable 10 by, initially, removing the outer neoprene jacket 25 and KEVLAR armor tape 22 to expose the conductors 13 and KEVLAR tension members 16 and 19. Once exposed, the tension members 16 and 19 are collected together to form a single cord 73 (FIG. 6). The cord 73 is then fixedly secured, by a collet and sleeve system 76, 79 and 82 (explained further below), to the connector housing 47. The exposed conductors 13, however, are loosely fed through bores 83 in the housing 47 (FIG. 8), around the collet and sleeve system 79 and 82, to the contact assembly 90. Accordingly, the conductors 13 are not fixedly secured to the connector housing 47 and, therefore, do not carry or transmit tensile loads to the housing 47.

Figure 8:
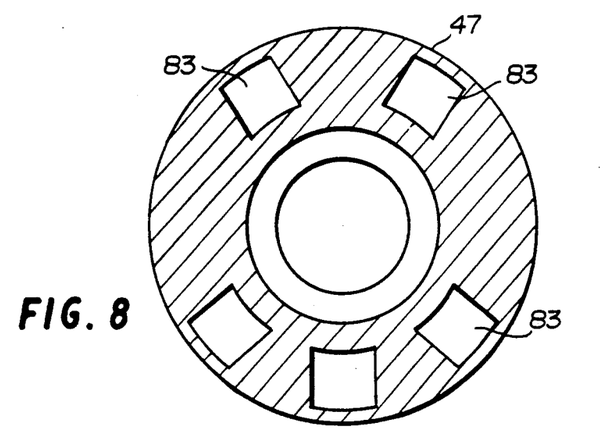
FIG. 8 is a cross-sectional view of the connector taken along line 8—8 of FIG. 6.
Figure 9A:
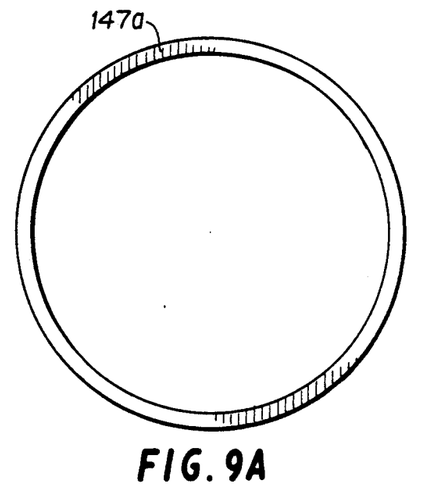
FIGS. 9a and 9b illustrate cross-sectional views of the respective components of an alternate, two-component, embodiment of the connector housing of FIG. 6.
Figure 9B:
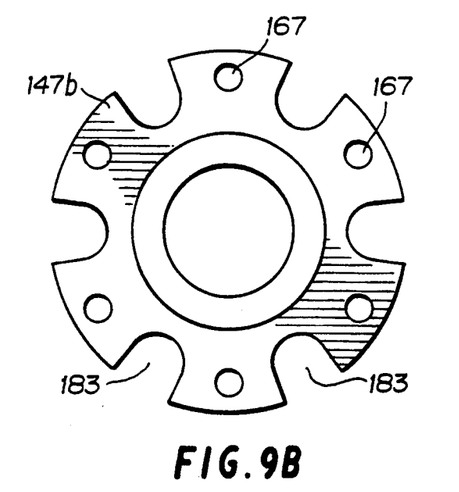
Figure 10:
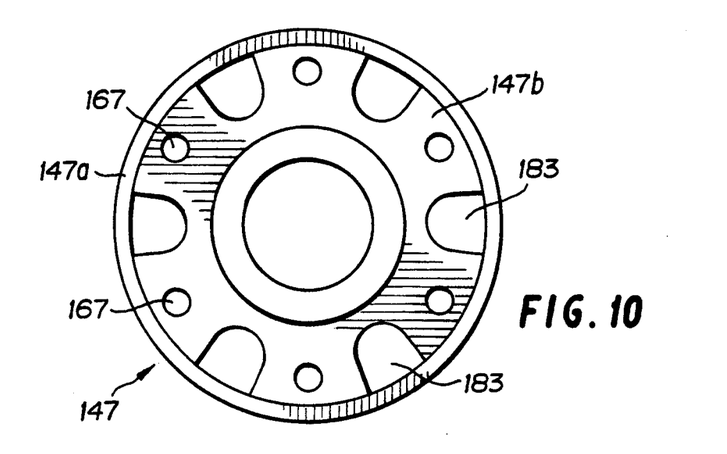
FIG. 10 illustrates a cross-sectional view of the components depicted in FIGS. 9a and 9b upon assembly thereof.
Figure 11:
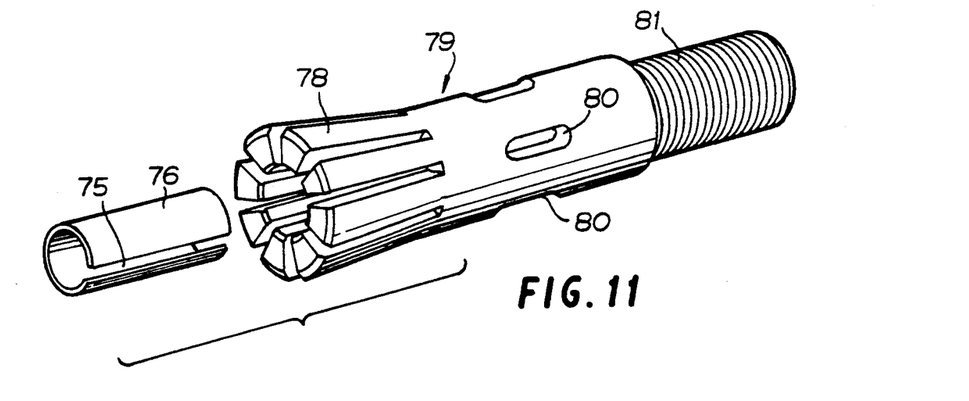
FIG. 11 is an exploded perspective view of a cord diametral adapter sleeve and collet member according to the present invention.

FIGS. 9a, 9b and 10 illustrate an alternate, two-component, embodiment of the connector housing. The one Piece casting of the connector housing 47 of FIG. 8 is suitable for high-volume production. However, it may be more economical to form the connector housing from two or more components. Connector housing 147 comprises two components, an outer sleeve 147a, and an inner collet member retainer Piece 147b. As shown in FIG. 10, when the inner piece 147b is inserted into the outer sleeve 147a bores 183 are formed. The conductors 13 are fed through the bores 183. The inner piece 147b also includes clearance holes 167 into which tie rods (not shown) may be inserted in order to connect the housing 147 to the gland assembly 48 and contact assembly 90.

FIGS. 11-14 illustrate the individual components of the collet and sleeve system depicted in FIG. 6 and the sequence for coupling them to the KEVLAR cord 73. The components include a cord diametral adapter sleeve 76 having a longitudinal slit 75. The sleeve 76 is slipped over the KEVLAR cord 73 and pushed back towards the body of the cable so that the cord 73 extends completely through the sleeve 76. The end of the cord 73 can then be threaded through a central bore 77 of a collet body 79.

Figure 12:
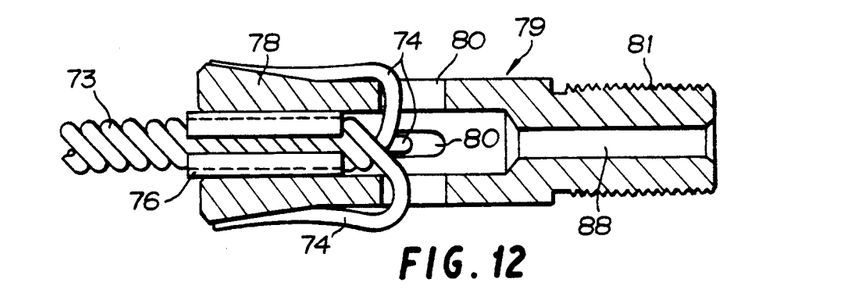
FIG. 12 is a cross-sectional view the cord diametral adapter sleeve and collet member connected to a tension cord according to the present invention.
Figure 13:
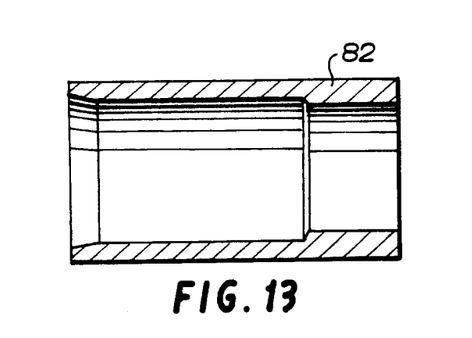
FIG. 13 is an elevational view of a collet/cord binder sleeve according to the Present invention.
Figure 14:
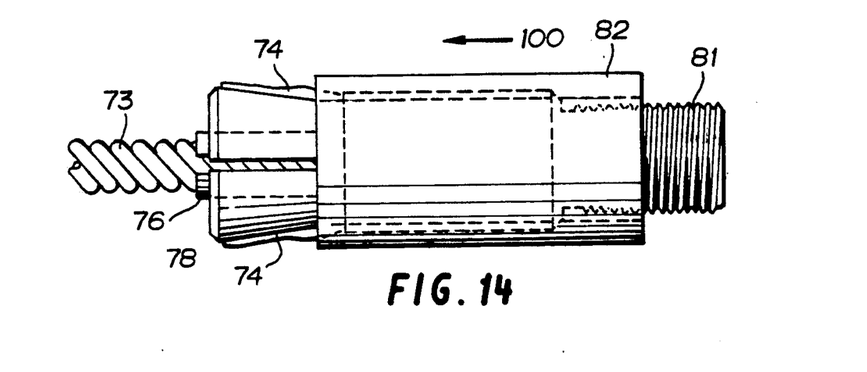
FIG. 14 is a cross-sectional view of the cord diametral adapter sleeve. collet member and collet/cord binder sleeve connected to the tension cord according to the present invention.

The collet body 79 has four pull-through ports 80 that connect the outer perimeter of the body 79 with the central bore 77. One end 78 of the collet body 79 is split and the other end 81 is provided with threads. As shown in FIG. 12, the KEVLAR cord 73 once inserted through the adapter sleeve 75 is divided into four separate strands 74 (only three strands are shown). Each KEVLAR strand 74 is pulled through a corresponding Port 80 and distributed around the split-end 78 of the collet body 79. A collet/cord binder sleeve 82 is then pulled over the collet body 79 and KEVLAR strands 74 (FIG. 14). As the binder sleeve 82 is pulled over the collet body 79 in a direction 100, the split end 78 of the collet body is forced radially inward, thereby clamping onto the diametral adapter sleeve 76. The adapter sleeve 76 in turn clamps down on the KEVLAR cord 73. At the same time, the binder sleeve 82 pinches the ends of the KEVLAR cord parts 74 between the inner perimeter of the binder sleeve 82 and the exterior perimeter of the collet body 79.

With the end of the KEVLAR cord 73 gripped by the collet body and binder sleeve 82, the entire assembly is inserted into a central bore 84 of the connector housing 47. The binder sleeve 82 is positioned adjacent a radial inwardly extending flange 86 of the connector housing 47. The threaded end 81 is extended through the flange 86. The collet and binder assembly may then be fixedly secured to the connector housing 47 by fastening a jam nut 85 onto the threaded end 81 of the collet body 79 on the side of the flange 86 opposite the binder sleeve 82. By tightening the jam nut 85, the collet body 79 is drawn towards the flange 86 further into the binder sleeve 79, thereby forcing the binder sleeve to clamp further down onto the split-end 78 of the collet body. This arrangement effectively secures the collet body 79 and binder sleeve 82 to the housing 47 and allows the tensile loads carried by the KEVLAR tension members 16 be transmitted through the collet body 79 and binder sleeve 82 to the flange 86 and, accordingly, the connector housing 47.

As a precaution, an epoxy resin may be injected through a core hole 88 in the threaded end 81 of the collet body 79 and allowed to cure. The hardened epoxy helps Prevent the KEVLAR cord 73 from disengaging from the collet body 79 upon application of appreciable tensile loads to the cable system 10.

The invention thus described provides a reliable cable and connector system for transmitting electrical power over Portable cables. Although the design approach of the present cable and connector system is used to protect conductors that carry electrical power, a similar approach could be used for cables that carry conductors that carry electrical communication signals. The design approach could also be used to carry fiber optic strands that transmit light waves.

Although the invention has been described in terms of what are at present believed to be its preferred embodiment, it will be apparent to those skill in the art that various changes may be made without departing from the scope of the invention. It is, therefore, intended that the appended claims cover such changes.

What is claimed is:

1. A cable system comprising:
    a cable, further comprising:
        elongate tensile member for carrying principal tensile forces applied to the cable;
        elongate conductor means for providing an energy path;
        armor tape means, wrapped around said conductor means and tensile means, for providing high puncture resistance and resisting substantial crushing loads applied to said cable, said armor tape means comprising flexible, substantially non-rigid, high strength material; and
        an outer jacket, surrounding said tape means, for providing abrasion and moisture protection for said conductor.

2. A cable system according to claim 1, wherein said tensile member comprises a cord made from an aramid fiber, said cord being located generally at the radial center of the cable.

3. A cable system according to claim 1, further comprising reinforcing means, enclosed by said tape means, for providing additional tensile support for the cable, said reinforcing means comprising a plurality of aramid fiber cords.

4. A cable system according to claim 1, wherein said tape means comprises at least one layer of high-strength tape made from an aramid fiber.

5. A cable system according to claim 4, wherein said at least one layer of high-strength tape is surrounded by a non-stick material.

6. A cable system according to claim 1, wherein said tape means comprises inner and outer layers of high-strength tape, said layers of high-strength tape being counterwound around said conductor means and said tensile member.

7. A cable system according to claim 6, wherein a first layer of nonstick tape is positioned between said inner and outer layers of high-strength tape.

8. A cable system according to claim 7, wherein a second layer of nonstick tape is positioned between said outer layer of high-strength tape and said outer jacket means.

9. A cable system according to claim 8, wherein a third layer of nonstick tape is positioned between said inner layer of high-strength tape and said conductor means.

10. A cable system according to claim 6, wherein said inner and outer layers of high-strength tape comprise of an aramid fiber.

11. A cable system according to claim 6, wherein said inner and outer layers of high-strength tape are coated with a nonstick material.

12. A cable system according to claim 1, wherein said conductor means comprises at least one conductor formed from a plurality of adjacent, electrically conducting wires and an insulating jacket that surrounds said wires.

13. A cable system according to claim 12, wherein a layer of nonstick, non-metallic tape is positioned between said said wires and said insulating jacket.

14. A cable system according to claim 12, wherein said wires are coated with a dry, conductive lubricant for reducing the friction between said adjacent wires when the cable is bent or twisted.

15. A cable system according to claim 14, wherein said lubricant comprises a thermo-setting polymer filled with a fine graphite powder.

16. A cable comprising:
    a high-strength tensile member;
    at least one conductor;
    high-strength armor tape wrapped around said at least one conductor and said tensile member; and
    an outer jacket that surrounds said high-strength tape;
    wherein principal tensile forces applied to the cable are supported by said high-strength tensile member such that the principal tensile forces are not transmitted to said at least one conductor; and
    wherein said high-strength armor tape is made from an aramid fiber having high puncture resistance and being capable of withstanding substantial compression forces that are applied to said cable.

17. A cable according to claim 16, wherein said outer jacket provides abrasion and moisture protection for said conductor.

18. A cable according to claim 16, wherein said at least one conductor comprises fiber optic strands that transmit light waves.

19. A cable according to claim 16, wherein said high-strength tensile member comprises a dielectric material.

20. A cable according to claim 19, wherein said dielectric material is an aramid fiber.

21. A cable according to claim 19, wherein said high-strength tape further comprises an inner and outer layer of high-strength tape, and wherein a first layer of nonstick tape is positioned between said inner and outer layers of high-strength tape.

22. A cable according to claim 21, wherein said inner and outer layers of high-strength tape are counter-wound around said at least one conductor and said tensile member.

23. A cable according to claim 21, wherein a second layer of nonstick tape is positioned between said outer layer of high-strength tape and said outer jacket and a third layer of nonstick tape is positioned between said inner layer of high-strength tape and said at least one conductor.

24. A cable according to claim 19, wherein said outer jacket comprises a neoprene material that provides abrasion and moisture protection for said at least one conductor.

25. A cable according to claim 24, wherein said neoprene material is reinforced with an aramid fiber braid.

26. A cable according to claim 16, wherein said at least one conductor comprises a plurality of adjacent, electrically conducting wires, an insulating jacket surrounding said wires, and a layer of nonstick tape positioned between said wires and said insulating jacket.

27. A cable according to claim 26, wherein said wires comprise copper.

28. A cable according to claim 26, wherein said wires comprise intercalated graphite compounds.

29. A cable according to claim 26, wherein said wires are capable of transmitting at least 200 amperes of electrical current.

30. A cable according to claim 26, wherein said wires are coated with a dry, conductive lubricant for reducing the friction between said adjacent wires.

31. A cable according to claim 30, wherein said lubricant comprises a thermo-setting polymer filled with a fine graphite powder.

32. A cable and connector system comprising:
  an energy conducting cable comprising a core tension member for supporting principal tensile loads that are applied to the cable, at least one conductor for conducting energy, and an outer protective jacket. that surrounds said tension member and said at least one conductor; and
  connector means attached to a distal end of said cable for providing an interface between said cable and a separate device, said connector means comprising:
    a hollow housing having at least one opening and an internal flange;
    an elongate collet member having a first end and an opposite, second end, a central bore extending longitudinally from said first end, and at least one port connecting said bore to the outer perimeter of the collet member;
    a binder sleeve having a generally cylindrical configuration; and
    a coupler adapted to engage said second end of said collet member;
  wherein said tension member is securely fastened to said connector means such that,
    one end of said tension member is threaded through said bore of the collet member and out said at least one port and layed flat against an exterior surface of said collet member;
    said binder sleeve surrounds said collet member such that said one end of the tension member is securely clamped between said exterior surface of the collet member and an interior surface of said binder sleeve;
    said coupler engages said second end of said collet member and said flange of said housing to securely fasten said collet member and surrounding binder sleeve to the housing; and
    said principal tensile loads are transmitted between the housing and the tension member and
  wherein said at least one conductor is loosely held within said housing such that said conductor does not support said principal tensile loads.

33. A cable and connector system according to claim 32, wherein said cable further comprises high-strength tape wrapped around said at least one conductor and said tension member for resisting substantial compression loads that are applied to said cable.

34. A cable and connector system according to claim 32, wherein said connector further comprises an adapter sleeve, said adapter sleeve being positioned between said tension member and collect member.

35. A cable and connector system according to claim 32, wherein epoxy is injected into said bore of said collet member to firmly secure the tension member to the collet member.

36. A cable and connector system according to claim 35, wherein said bore of said collet member extends to the second end of the collet member and said epoxy is injected into said bore at the second end of the collet member.

37. A cable and connector system according to claim 32, wherein said plurality of external threads, and said coupler comprises a jam nut having internal threads engagable with said external threads of said collet member.

38. A cable and connector system according to claim 37, wherein said binder sleeve is positioned on one side of said flange, said jam nut is positioned on an opposite side of said flange, and said second end of said collet member extends through said flange and is engaged by said jam nut on said opposite side of said flange.

39. A cable and connector system according to claim 32, wherein said at least one conductor comprises a plurality of adjacent conductors; wherein interstices are formed between said adjacent conductors and between said conductors and said outer protective jacket; and wherein said cable further comprises secondary tension members disposed in said interstices for providing additional support for tensile loads applied to said cable.

40. A cable and connector system according to claim 39, wherein said secondary tension members are gathered with said principal tension member, at a point where the cable joins the connector means, such that said secondary tension members are securely fastened to said connector means in the same manner as said principal tension member.

41. A cable system, comprising:
  a cable, further comprising:
    elongate tensile member for carrying principal tensile forces applied to the cable;
    elongate conductor means for providing an energy path; armor tape wrapped around said conductor means and tensile member for resisting substantial compression forces applied to said cable; and
    an outer jacket, surrounding said armor tape, for providing abrasion and moisture protection for said conductor means; and
  a connector at a distal end of said cable for providing an interface between said cable and a separate device, said connector comprising:
    a hollow housing having at least one opening and an internal flange;

an elongate collet member having a first end and an opposite, second end, a central bore extending longitudinally from said first end, and at least one port connecting said bore to the outer perimeter of the collet member;

a binder sleeve having a generally cylindrical configuration; and a coupler adapted to engage said second end of said collet member;

wherein said tensile member is securely fastened to said connector such that, one end of said tensile member is threaded through said bore of the collet member and out said at least one port and layer flat against an exterior surface of said collet member;

said binder sleeve surrounds said collet member such that said one end of the tensile is securely clamped between said exterior surface of the collet member and in interior surface of said binder sleeve; and said coupler engages said second end of said collet member and said flange of said housing to securely fasten said collet member and surrounding binder sleeve to the housing.

42. A cable system according to claim 41, wherein an epoxy resin is injected into said bore of said collet member to firmly secure the tensile means to the collet member.

43. A cable system according to claim 42, wherein said bore of said collet member extends to the second end of the collet member and said epoxy is injected into said bore at the second end of the collet member.

44. A cable and connector system, comprising:

an energy conducting cable comprising a core tension member for supporting principal tensile loads that are applied to the cable, at least one conductor for conducting energy, and an outer protective jacket that surrounds said tension member and said at least one conductor; and a connector attached to a distal end of the said cable for providing an interface between said cable and a separate device, said connector comprising:

a hollow housing having means at one end for coupling the housing and said at least one conductor to the separate device; and attachment means disposed in said housing for attaching said tension member to said housing such that principal tensile loads applied to the cable are carried by said tension member;

wherein said at least one conductor is loosely held within said housing such that said conductor does not support the principle tensile loads.

* * * * *